United States Patent [19]

Lagrange et al.

[11] Patent Number: 4,475,144
[45] Date of Patent: Oct. 2, 1984

[54] DIELECTRIC CERAMIC OF BARIUM TITANATE, LITHIUM OXIDE AND ZINC FLUORIDE, A CAPACITOR AND A PROCESS

[75] Inventors: Alain Lagrange; Alain Beauger, both of Bagnolet, France

[73] Assignee: LCC.CICE-Compagnie Europeenne de Composants Electroniques, France

[21] Appl. No.: 461,496

[22] Filed: Jan. 27, 1983

[30] Foreign Application Priority Data

Feb. 2, 1982 [FR] France ............... 82 01653

[51] Int. Cl.$^3$ .............................................. C04B 35/46
[52] U.S. Cl. ................................. 361/321; 501/137; 501/138; 501/151
[58] Field of Search ....................... 501/137, 138, 151; 361/321

[56] References Cited

U.S. PATENT DOCUMENTS

| 2,602,753 | 7/1952 | Woodcock et al. | 501/137 |
| 3,340,074 | 9/1967 | Herczog | 501/138 |
| 3,753,911 | 8/1973 | Walker et al. | 501/138 |
| 3,975,307 | 8/1976 | Matsuo et al. | 501/137 |
| 4,082,906 | 4/1978 | Amin et al. | 501/137 |
| 4,241,378 | 12/1980 | Dorrian | 361/305 |
| 4,400,759 | 8/1983 | Lagrange et al. | 501/137 |
| 4,400,760 | 8/1983 | Lagrange et al. | 501/137 |

FOREIGN PATENT DOCUMENTS 1051728 12/1966 United Kingdom .

Primary Examiner—Helen M. McCarthy
Attorney, Agent, or Firm—Cushman, Darby & Cushman

[57] ABSTRACT

The present invention provides a dielectric ceramic composition having excellent electric properties and able to be sintered at a temperature between 750° and 1000° C.

According to the invention, said composition comprises from 90 to 98% by weight of barium titanate, from 0.5 to 2.5% by weight of lithium oxide and 1.5 to 8% by weight of zinc fluoride.

6 Claims, No Drawings

DIELECTRIC CERAMIC OF BARIUM TITANATE, LITHIUM OXIDE AND ZINC FLUORIDE, A CAPACITOR AND A PROCESS

BACKGROUND OF THE INVENTION

The present invention relates to a dielectric ceramic composition of ferro-electric nature, with a barium titanate basis, as well as a capacitor using such a composition. It also relates to a process for manufacturing this composition.

Barium titanate based ceramic compositions are well known particularly in their applications for forming capacitors. They have in fact a very high dielectric constant making them quite well adapted to such a use. Such ceramic compositions, well-known to a man skilled in the art under the term "type II", are described for example in U.S. Pat. Nos. 2,402,518, 2,443,211 and 3,529,978.

Generally, the ceramic compositions are sintered in air or in a reducing atmosphere at temperatures close to 1200° to 1400° C. When capacitors are formed, such for example as capacitors of the multi-layer type, the metal electrodes of these capacitors are of course deposited on the ceramic material before sintering. Consequently, this requires using electrodes made from precious metals such as platinum, palladium, gold or alloys thereof. These electrodes are generally deposited by silk screen printing.

Such ceramic compositions in their use for manufacturing capacitors present then essentially two drawbacks:
- precious metals are required for forming the electrodes, which increases considerably the cost of such capacitors,
- the high sintering temperature increases the risks of interaction between the ceramic and the electrodes, which correspondingly increases the probability of defects in said electrodes.

So, attempts have been made recently to perfect dielectric ceramic compositions allowing common metal to be used, of a much lower price, while lowering the sintering temperature of said compositions.

SUMMARY OF THE INVENTION

Dielectric ceramic compositions of type II have now been found which, while having excellent dielectric properties, allow the above raised problem to be solved. To this end the dielectric ceramic compositions of the invention are characterized in that they comprise from 90% to 98% by weight of barium titanate, from 0.5% to 2.5% by weight of lithium oxide and from 1.5% to 8% by weight of zinc fluoride.

Preferably, 92% to 95% by weight of barium titanate, 1% to 2% by weight of lithium oxide and 3% to 6% by weight of zinc fluoride will be used.

It has in fact been surprisingly discovered that the new ceramic compositions described above had a sintering temperature substantially reduced with respect to the similar known compositions while having quite excellent electric properties. In particular, said compositions have excellent electric properties when a barium titanate is used in which the molar ratio $X = TiO_2/BaO$ is less than 1, and preferably between 0.97 and 0.98. In this latter case, as will be seen further on, the electric properties of these compositions are quite exceptional.

Such a stoichiometry in the barium titanate used goes quite against the accepted ideas in this field when it is desired to lower the sintering temperature. In fact, a man skilled in the art knows that usually barium titanate based compositions have their sintering temperature reduced when the stoichiometry of barium titanate is increased, that is to say when an excess of titanium ions is provided with respect to the number of barium ions, so that the previously mentioned ratio X is greater than 1. Generally, this increase is of the order of 2%.

Conversely, it is well known that a reduction in the number of titanium ions with respect to the number of barium ions in the barium titanate usually leads to an increase in the sintering temperature. (By sintering temperature is of course meant the temperature or range of temperatures at which maximum densification of the product is obtained).

In a preferred embodiment, the dielectric ceramic compositions of the invention are such that the lithium oxide is introduced into the composition in the form of a lithium salt capable of releasing it at high temperature. Preferably, this lithium salt will be chosen among lithium nitrates, sulfates or carbonates. In this case, the proportions by weight of the lithium salt will be such that, after decomposition of said salt at high temperature, an amount of lithium oxide is obtained in the above-mentioned range. It should in fact be understood that if a lithium salt is introduced into the starting composition capable of releasing lithium oxide $Li_2O$, it is important to count in the weight of the composition only the molar fraction of the salt corresponding to the lithium oxide. For example, if 30 g of lithium carbonate $Li_2CO_3$ is introduced into the composition which will release lithium oxide and carbonic gas at high temperature, this latter will only count for $$30 \text{ g} \times \frac{\text{molecular weight of } Li_2O}{\text{molecular weight of } Li_2CO_3},$$

$$\text{i.e. } 30 \text{ g} \times \frac{29.88}{73.88} = 12.13 \text{ g}.$$

Generally, the sintering temperature of the compositions of the invention will be greater than 750° C. and will vary between 750° C. and 1000° C.

The process for forming capacitors in accordance with the invention consists then in forming a fire-clay containing barium titanate, zinc fluoride and the lithium salt in the above-indicated proportions then in forming the capacitor in a way known per se, the sintering temperature being greater than or equal to 750° C.

DESCRIPTION OF THE PREFERRED EMBODIMENTS

The invention will be better understood from the following non limiting examples:

EXAMPLES 1 AND 2

In a ball crusher is introduced 100 g of a mixture containing barium titanate $BaTiO_3$, zinc fluoride $ZnF_2$, lithium carbonate $Li_2CO_3$. The lithium carbonate will free lithium oxide $Li_2O$ after sintering. In the table below, the percentage by weight of the different elements of the composition is given, the percentage by weight of lithium carbonate being brought down to its corresponding percentage by weight of lithium oxide $Li_2O$ (see above).

The crushing of these different components is carried out in the presence of 150 cm³ of alcohol by means of 200 g of alumina balls for fifteen hours.

The slip obtained is dried, passed through a sieve and then mixed with 130 g of 3% latex in trichlorethane. The paste obtained is shaped as disks which, after sintering, have a diameter of 8.3 mm and a thickness of about 0.6 mm. These disks are sintered at a temperature of 930° C. in air for one hour thirty minutes. Each of the faces of the capacitors is then metallized by means of a silver paste.

The results obtained are given in the table below, in which d designates the density of the ceramic, R the linear shrinkage, C the capacity and tangent δ the dielectric losses measured at 1 KHz at 1 true volt, ε the dielectric constant of the material, RI the insulating resistance of the capacitor measured at 50 volts and ΔC/C the relative variation of capacity between the value of the capacity at 20° C. and that of the one at the different temperatures mentioned (+10° C. and +85° C.).

The stoichiometry of the barium titanate used is such that the ratio X=TiO₂/FaO was equal to 0.97, that is to say that there was an excess of barium with respect to titanium.

TC designates the Curie temperature of the material, above which temperature the material is paraelectric and below which it is ferro-electric.

| EXAMPLE No | 1 | 2 |
|---|---|---|
| BaTiO₃ (%) | 94.865 | 92.3 |
| Li₂O (%) | 1.15 | 1.73 |
| ZnF₂ (%) | 3.985 | 5.97 |
| d(g/cm3) | 5.52 | 5.42 |
| R(%) | 17.0 | 17.4 |
| C(pF) | 2740 | 1870 |
| tan δ × 10⁺⁴ | 35 | 16 |
| (20° C.) | 4310 | 3650 |
| RI(GΩ) | 450 | 240 |
| ΔC/C +10° C. | +15% | +15% |
| ΔC/C +85° C. | −54% | −55% |
| ε at TC | 6300 | 7500 |
| TC(°C.) | −25 | −50 |

This table clearly shows the variations in the properties of the dielectric compositions of the invention for a given stoichiometry of barium titanate with respect to the proportions of zinc fluoride and lithium oxide used. It can be seen that the value of the dielectric constant is particularly high, allied to very small dielectric losses, and a high insulating resistance.

What is claimed is:

1. A ceramic consisting essentially of a dielectric composition having 90% to 98% by weight of barium titanate and the balance being 0.5% to 2.5% by weight of lithium oxide and 1.5% to 8% by weight of zinc fluoride wherein the molar ratio of TiO₂/BaO in said barium titanate is greater than or equal to 0.97 and less than or equal to 0.98.

2. The dielectric composition as claimed in claim 1, having 92% to 95% by weight of barium titanate and the balance being 1% to 2% by weight of lithium oxide and 3% to 6% by weight of zinc fluoride.

3. The dielectric composition as claimed in claim 1, wherein the lithium oxide is obtained from a lithium salt which is capable of liberating said oxide at high temperature.

4. The dielectric composition as claimed in claim 3, wherein the lithium salt is selected from lithium nitrates, sulfates or carbonates.

5. An electric capacitor comprising at least one dielectric layer covered by conductive metal electrodes, wherein the dielectric layer is formed from a composition as claimed in claim 1.

6. A process for manufacturing an electric capacitor, the process comprising the steps of (a) producing a calcined powder consisting essentially of 90% to 98% by weight of barium titanate the balance being 1.5% to 8% by weight of zinc fluoride and 0.5% to 2.5% by weight of lithium oxide introduced in the form of a salt and the ratio of TiO₂/BaO in said barium titanate being greater than or equal to 0.97 and less than or equal to 0.98, and (b) subsequently fabricating the capacitor by means of said calcined powder in a way known per se, said capacitor having a dielectric ceramic layer which has been sintered at a temperature greater than or equal to 750° C., at which temperature the lithium salt is decomposed and gives rise in particular to the formation of lithium oxide.

* * * * *